(12) United States Patent  
McNamara et al.

(10) Patent No.: US 8,981,945 B2  
(45) Date of Patent: Mar. 17, 2015

(54) BUS CONDITION MONITORING SYSTEM

(75) Inventors: Thomas P. McNamara, Lake Mary, FL (US); Harshavardhan M. Karandikar, Longwood, FL (US); Marek Budyn, Krakow (PL); Michael G. Urmson, Bismarck, ND (US)

(73) Assignee: ABB Research Ltd., Zurich (CH)

( * ) Notice: Subject to any disclaimer, the term of this patent is extended or adjusted under 35 U.S.C. 154(b) by 345 days.

(21) Appl. No.: 13/375,995

(22) PCT Filed: Jul. 8, 2009

(86) PCT No.: PCT/US2009/049925  
§ 371 (c)(1),  
(2), (4) Date: Mar. 26, 2012

(87) PCT Pub. No.: WO2011/005254  
PCT Pub. Date: Jan. 13, 2011

(65) Prior Publication Data  
US 2012/0194344 A1 Aug. 2, 2012

(51) Int. Cl.  
*G08B 17/00* (2006.01)  
*H02J 13/00* (2006.01)

(52) U.S. Cl.  
CPC ..................................... *H02J 13/00* (2013.01)  
USPC ...... 340/584; 340/539.26; 340/588; 340/639; 702/130

(58) Field of Classification Search  
CPC ...... H02H 3/28; H02H 1/0007; H01H 33/027  
USPC ......... 340/584, 588, 589, 664, 635, 638, 639, 340/539.26; 361/103, 93.1, 93.8; 702/127, 702/130, 182, 189  
See application file for complete search history.

(56) References Cited

U.S. PATENT DOCUMENTS

| 5,525,976 A | 6/1996 | Balgard |
| 6,222,448 B1 | 4/2001 | Beck et al. |

(Continued)

FOREIGN PATENT DOCUMENTS

| CN | 2504619 Y | 8/2002 |
| CN | 1504732 A | 6/2004 |

(Continued)

OTHER PUBLICATIONS

Reese, C et al.: "Determination of Load and Generation Composition in Distribution Grids", Power Systems Conference and Exposition 2009 (PES '09), IEEE/PES, IEEE, Piscataway, NJ, USA, Mar. 15, 2009, pp. 1-7. (XP031450694, ISBN 978-1-4244-3810-5).*

(Continued)

*Primary Examiner* — Thomas Mullen  
(74) *Attorney, Agent, or Firm* — Robert P. Nupp

(57) ABSTRACT

A method and system is disclosed for monitoring switchgear. The current supplied to the main bus is measured. The current flowing through a plurality of feeder circuits is also measured. The temperature of the main bus at one or more nodes is measured, wherein a node is a connection point between the main bus and each feeder circuit. The current flowing through one of the nodes is determined by subtracting the current flow through each the feeder circuit upstream from the node, from the current supplied by the input circuit. An alarm condition is determined if the temperature at a node exceeds a predetermined temperature value for a given current flow through the node. The alarm condition is thereafter displayed to a switchgear operator.

10 Claims, 8 Drawing Sheets

(56) References Cited

U.S. PATENT DOCUMENTS

| | | |
|---|---|---|
| 6,522,247 B2 | 2/2003 | Maruyama et al. |
| 6,892,115 B2 | 5/2005 | Berkcan et al. |
| 6,957,170 B2 | 10/2005 | Laurosch et al. |
| 7,013,186 B2 | 3/2006 | Kreiling et al. |
| 7,145,322 B2 | 12/2006 | Solveson et al. |
| 7,209,804 B2 | 4/2007 | Curt et al. |
| 7,215,299 B2 | 5/2007 | Planning et al. |
| 2002/0021226 A1 | 2/2002 | Clement et al. |
| 2005/0168891 A1 | 8/2005 | Nilman-Johnson et al. |
| 2005/0231351 A1 | 10/2005 | Kreiling et al. |
| 2006/0119344 A1 | 6/2006 | Benke et al. |
| 2007/0144779 A1 | 6/2007 | Vicente et al. |
| 2007/0186668 A1 | 8/2007 | Garverick et al. |
| 2007/0253132 A1* | 11/2007 | Nakamura et al. ............ 361/103 |
| 2009/0109021 A1* | 4/2009 | Paoletti et al. ................ 340/540 |

FOREIGN PATENT DOCUMENTS

| | | |
|---|---|---|
| CN | 1753045 A | 3/2006 |
| CN | 2784897 Y | 5/2006 |
| CN | 1877272 A | 12/2006 |
| CN | 1920502 A | 2/2007 |
| CN | 1920503 A | 2/2007 |
| CN | 1932907 A | 3/2007 |
| CN | 1953378 A | 4/2007 |
| CN | 200947246 Y | 9/2007 |
| CN | 101055209 A | 10/2007 |
| DE | 202006001849 U1 | 5/2006 |
| DE | 102006011127 A1 | 9/2007 |
| EP | 0862258 A1 * | 9/1998 |
| EP | 1850438 A2 * | 10/2007 |
| JP | 4325819 | 11/1992 |
| JP | 11064422 | 3/1999 |
| TW | 264188 B | 10/2006 |
| WO | 2005073992 A1 | 8/2005 |
| WO | 2007072193 A2 | 6/2007 |
| WO | 2007072194 A2 | 6/2007 |
| WO | 2011005254 A1 | 1/2011 |

OTHER PUBLICATIONS

Reese, C et al., "Determination of load and generation composition in distribution grids" Power Systems Conference and Exposition, 2009. PES '09. IEEE/PES, IEEE, Piscataway NJ, USA Mar. 15, 2009, p. 1-7.

International Bureau of WIPO, International Preliminary Report on Patentability issued on Jan. 1, 2012 in relation with application PCT/US2009/049925.

International Searching Authority, Written Opinion of the International Searching Authority issued in relation with application PCT/US2009/049925.

International Searching Authority, Inernational Search Report issues on Jun. 17, 2010 in relation with application PCT/US2009/049925.

* cited by examiner

BUS CONDITION MONITORING SYSTEM

TECHNICAL FIELD

The present invention relates to a system and method for determining the condition of electrical equipment by monitoring and analysis of current and temperature at the bus bar and cable joints.

BACKGROUND

Electrical switchgear is used in power systems to both distribute electrical power and selectively isolate electrical loads. Switchgear is produced in many forms, but typically includes a combination of electrical elements such as disconnects, fuses, circuit breakers and a main distribution bus. Switchgears are located anywhere that electrical distribution, isolation and/or protection may be required. These locations may include, for example, generators, factories, motors, transformers, and substations.

Because switchgear distributes electrical current, temperature buildup becomes an important characteristic to monitor. In particular, unexpected temperature rise at a particular location could indicate corrosion or some other type of defect. If left uncorrected, this defect could result in catastrophic failure resulting in deactivated loads and potentially hazardous conditions to personnel.

Temperature readings alone may not provide sufficient information for diagnosis of switchgear defects. This is because temperature fluctuations are not only caused by defects, but are also closely tied to current loading levels. However, because of space and cost constraints, providing a current measuring device at each important node or connection point is impractical.

Thus, there exists a need in the art for a system and method that monitors, analyzes and correlates current and temperature without a current measuring device at each monitored location.

SUMMARY OF THE INVENTION

According to one aspect of the present invention, a system is provided for monitoring a switchgear. The switchgear includes a main bus, a plurality of feeder circuits, and an input circuit. The monitoring system includes a plurality of temperature sensors coupled to the main bus at nodes, wherein a node is a connection point between the main bus and each feeder circuit. An input current sensor is positioned to measure the power supplied to the main bus by the input circuit. A plurality of output current sensors is positioned to measure the power flowing through the plurality of feeder circuits. The system further includes a processor, one or more storing units for storing signals and software program instructions which are stored in one or more of the storing units and when executed by the processor causes the system to perform the following method. An electrical configuration is received that defines the relative locations and electrical connections between the main bus, the feeder circuits, the input circuits and the nodes. The current flow through one of the nodes is determined by subtracting, the current flow through each feeder circuit upstream from the node, from the current supplied by the input circuit. An alarm condition is determined if the temperature at a node exceeds a predetermined temperature value for a given current flow through the node. The alarm condition is thereafter displayed to a switchgear operator.

According to another aspect of the present invention, a method is disclosed of monitoring switchgear having a main bus, a plurality of feeder circuits, and an input circuit. The method includes measuring the current supplied to the main bus by the input circuit. The current flowing through the plurality of feeder circuits is measured. The temperature of the main bus at one or more nodes is measured, wherein a node is a connection point between the main bus and each feeder circuit. The current flowing through one of said nodes is determined by subtracting the current flow through each the feeder circuit upstream from the node, from the current supplied by the input circuit. An alarm condition is determined if the temperature at a node exceeds a predetermined temperature value for a given current flow through the node. The alarm condition is thereafter displayed to a switchgear operator.

BRIEF DESCRIPTION OF THE DRAWINGS

The features, aspects, and advantages of the present invention will become better understood with regard to the following description, appended claims, and accompanying drawings where:

DETAILED DESCRIPTION OF THE INVENTION

Figure 1:
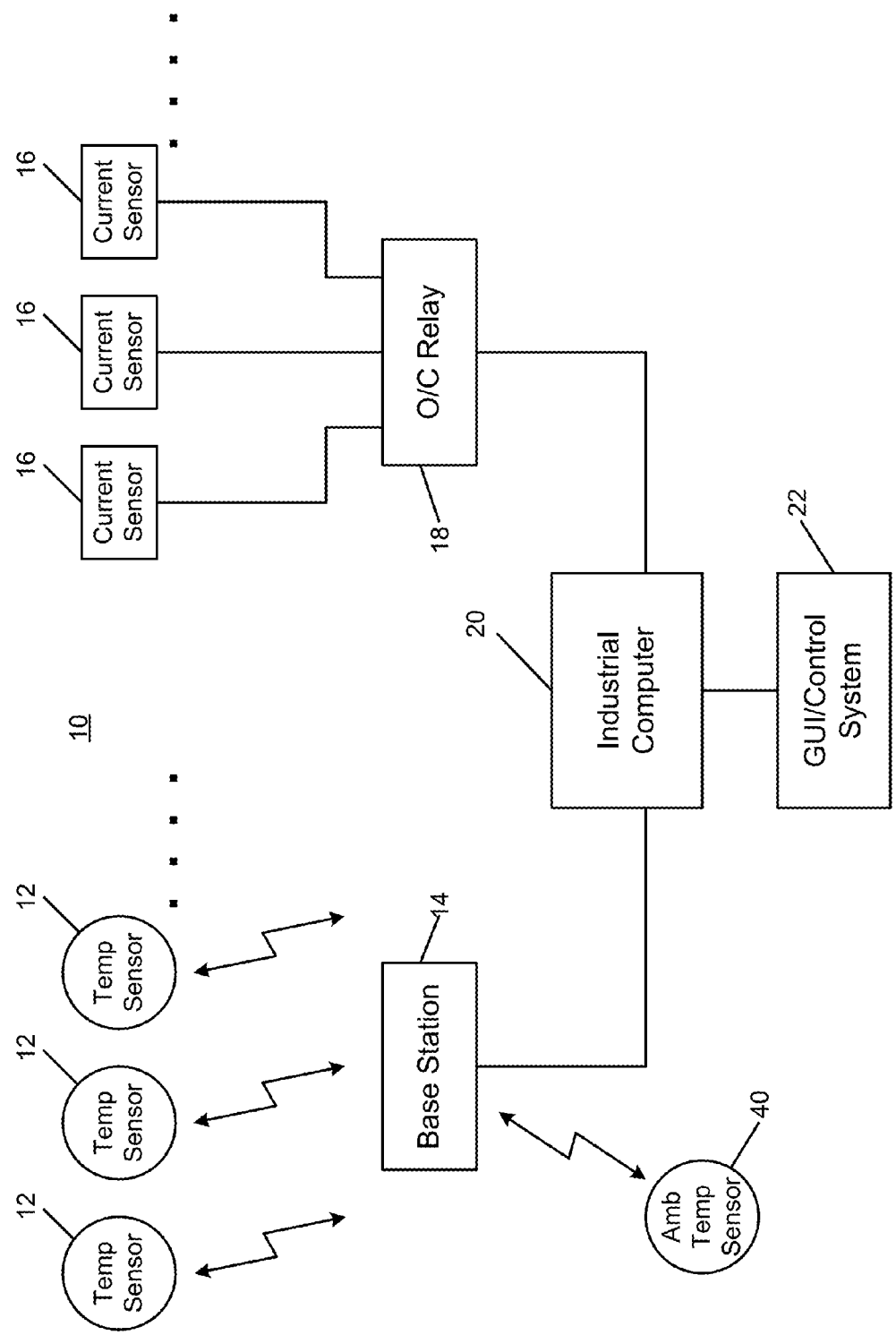
FIG. 1 is a view schematically illustrating a monitoring system according to the present invention.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

The present invention is a method and system that monitors the internal characteristics of switchgear and identifies deficient switchgear internal connections. Deficiencies may include, for example, corrosion, improper mounting or screwing, overloading, etc. Additionally, general performance information regarding the switchgear as a whole can be ascertained using the present invention.

With reference now to FIG. 1, a system according to the present invention is shown and generally indicated by the numeral 10. System 10 includes a plurality of temperature sensors 12 which, as will be seen, are placed at various locations in a switchgear. In one embodiment, the temperature sensors 12 are wireless, meaning each sensor 12 may include physical sensor, internal power source and communications electronics. It should be appreciated that the physical sensor, power source and/or communications module may not physically reside in the same physical enclosure but may be in separate enclosures. According to one embodiment, sensors 12 are secured proximate to each main bus bolted connection (e.g., 1 per phase in a multi-phase busbar arrangement) and each cable lug connection (e.g., 1 per phase in a multi-phase busbar arrangement). The sensors 12 at the main bus bolted connection are mounted on the surface of the copper bus at bolted joints. The temperature sensors 12 are in wireless communication with a base station 14. In this manner the temperature sensors 12 transmit temperature measurements of the various bus and cable lug connections.

Figure 2:
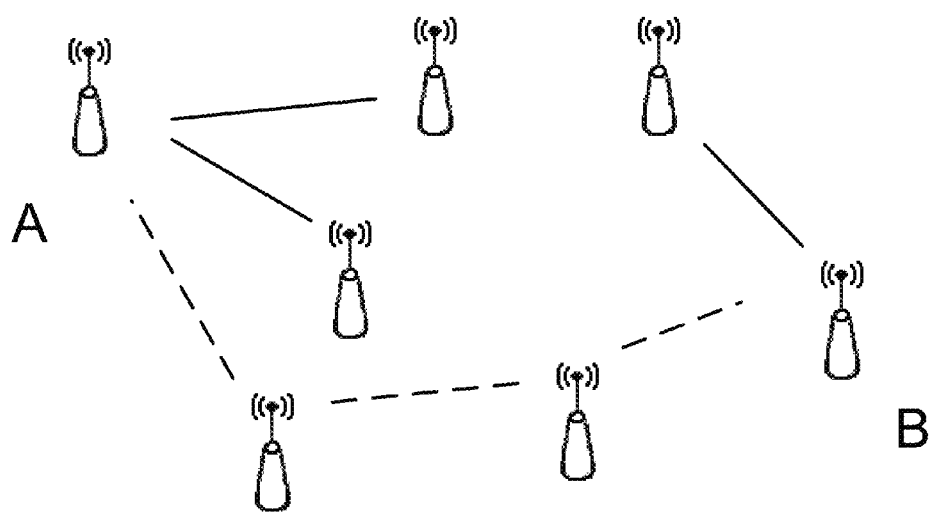
FIG. 2 is a partially schematic view of a mesh network according to the present invention.

According to one embodiment, the temperature sensors 12 communicate with each other, forming a mesh network. The mesh network is advantageous in the switchgear environment because of interference, potentially long distances, and heavy shielding between the sensors and the data collection and storage modules. The mesh network is a network infrastructure model that allows the transferring or routing of network signals or data packets from point A to point B using an indirect path. The possible paths and possible direct connections are analyzed by the individual sensors and do not require an external coordinator or mesh manager. With reference to FIG. 2, it can be seen that node A is capable of communicating only with the neighboring nodes within range. Likewise, node B is capable of communicating only with neighboring nodes within range. Using the mesh network, however, a signal can propagate through other nodes to reach a directly inaccessible node (dashed line from A to B in FIG. 2). In this manner, the communication between any two nodes (temperature sensors) in a switchgear is enabled. Thus, one or more nodes may be placed in a first compartment of a given switchgear cabinet, and one or more nodes may be placed in a second, adjoining compartment. One of the plurality of nodes may be placed within range of a data retrieval and/or storage module (base station 14) located inside or outside the switchgear. Readouts from the temperature sensors are routed between nodes among the network until they reach the node in communication with the data retrieval and/or storage module. In this way, data that is generated even within internal parts of the switchgear can be transferred to a single access point, avoiding the need for multiple base stations.

Referring again to FIG. 1, system 10 further includes a plurality of current sensors 16 secured at various locations in the switchgear. As will be discussed in greater detail below, each current sensor 16 measures the current flowing through a given location in the switchgear. Each current sensor 16 is in communication with a relay 18 which monitors the current sensors 16 and provides trip commands upon detection of a predetermined condition. In the present embodiment, the relay 18 is an over-current relay, however, it should be appreciated that other forms of relays or base stations may be employed to communicate with the current sensors 16.

Base station 14 and relay 18 are each in communication with an industrial computer 20. As will be described in greater detail below, the computer 20 receives the measured temperature and current values to determine, among other things, the location of defective bus connections. As will be appreciated by one of ordinary skill in the art, the industrial computer may include a computer readable medium having computer-readable instructions stored thereon which, when executed by a processor, carry out the operations of the present invention. The computer-readable medium may be any medium that can contain, store, communicate, propagate, or transport the user-interface program instruction for use by or in connection with the instruction execution system, apparatus, or device and may by way of example but without limitation, be an electronic, magnetic, optical, electromagnetic, infrared, or semiconductor system, apparatus, device, or propagation medium or other suitable medium upon which the program is printed. More specific examples (a non-exhaustive list) of the computer-readable medium would include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Computer program code or instructions for carrying out operations of the present invention may be written in any suitable programming language provided it allows achieving the described technical results.

The industrial computer 20 may then process and output the information to a process control system, a graphical user interface or an alarm mechanism 22. For example, with reference to FIG. 3, an exemplary graphical user interface may include a still image of a switchgear 24 with temperature values 26 superimposed over individual cubicles. Normal operating conditions could be indicated by, for example, a green background and abnormal operating conditions may be indicated by, for example, a yellow or red back ground. Of course any number of user interfaces may be provided. In still other embodiments, each switchgear cabinet may be provided with a status indicator, such as a warning light or display screen.

Figure 3:
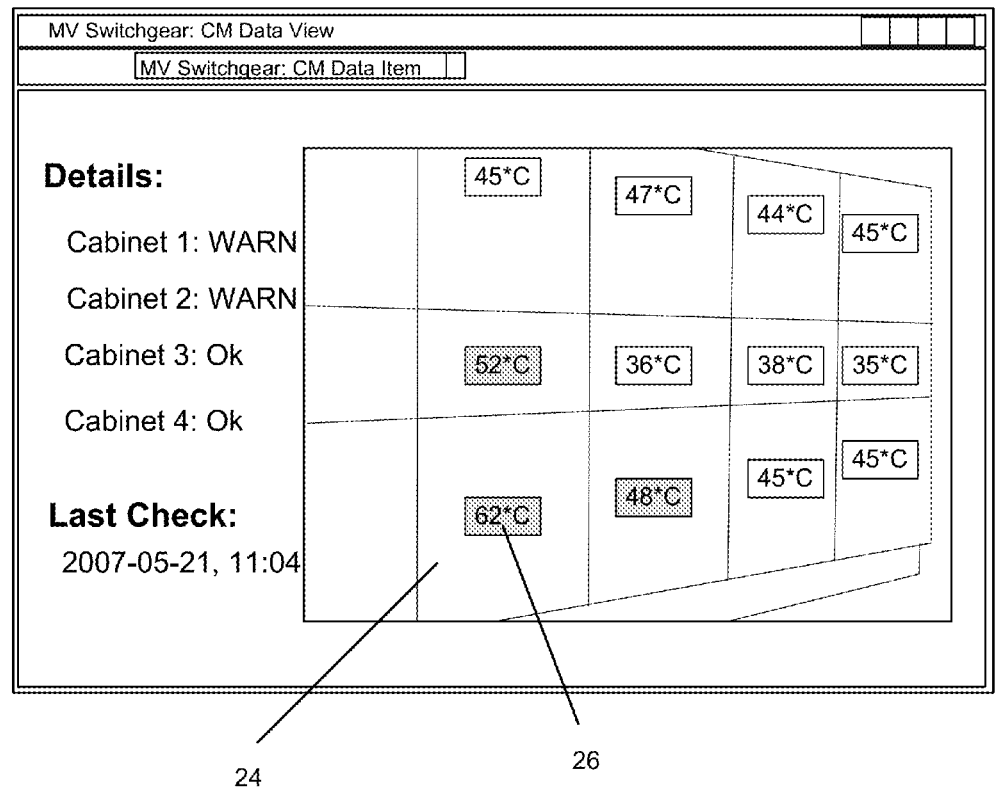
FIG. 3 is a view illustrating an exemplary graphical user interface according to the present invention.

More detailed information may be accessed by, for example, clicking one of the frames shown in FIG. 3. Temperature trends over a user defined time period may be displayed, as well as temperature-current relationships. Historical data may also be displayed showing trends extending back a period of days, weeks, months or years. In these or other embodiments, the temperature-time or temperature-current relationships may be output in the form of graphs. Still further, the measured temperatures may be correlated to temperature prediction bands or curves. Because temperature rise is approximately proportional to current squared, predicted changes in temperature (due to current changes) can be compared to measured changes. Thus, for a given current flow at a particular location, the system may determine an appropriate expected temperature range and if outside this range, alert the operator. This enables an operator to identify potential problems, even at reduced current loading.

Figure 4:
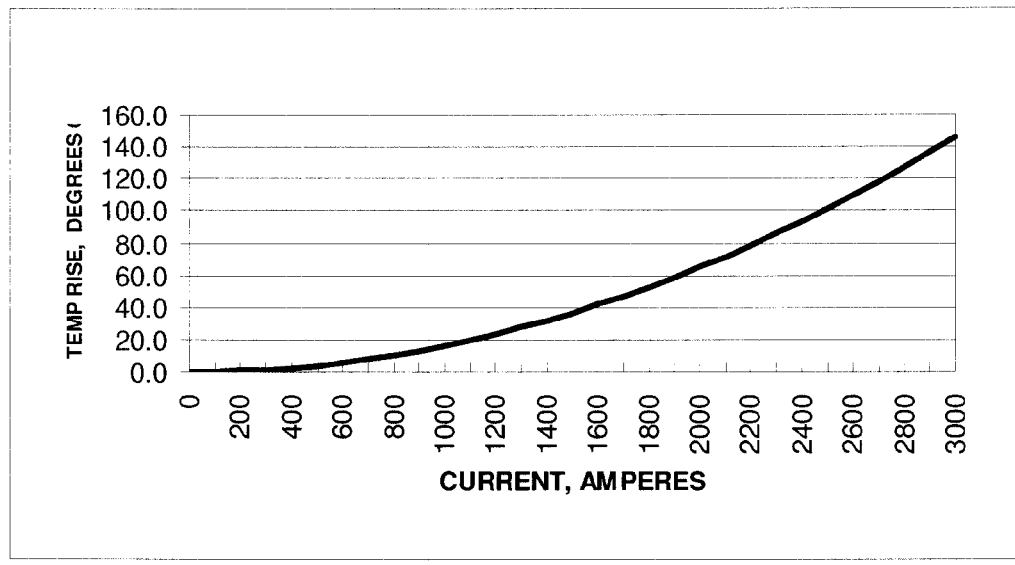
FIG. 4 is a graph displaying an exemplary temperature versus current curve.

With reference to FIG. 4, a graph is shown of an exemplary system wherein temperature rise vs current is plotted. The temperature of a bus may be determined by the following equation:

$$T = k * (I^2)$$

where: I is the current flowing through the bus;
T is the temperature at the bus location;
k is a temperature constant that correlates to the size, geometry and composition of the bus.

The k factor may be determined experimentally by inputting a known current and directly measuring the temperature. Thus, with the k factor known, an expected temperature vs current curve may be calculated. By knowing the current, which will be discussed later in greater detail, the expected temperature at a particular node may be determined. That expected temperature may then be compared to the actual measured temperature and, if the temperature is outside a tolerance range, an alarm may be initiated. For example, in FIG. 4, it can be seen that at the rated current of 2000 Amps, the bus temperature is 65 degrees C. If the predetermined tolerance range is 10 percent, an alarm will sound if the temperature exceeds 71.5 degrees. Other tolerance ranges may be selected, such as absolute ranges (e.g., 5 degrees C.) or ranges that vary depending on a temperature range (e.g., 10% at currents 0-1000 amp and 5% for currents at 1001-3000 amp).

Figure 5:
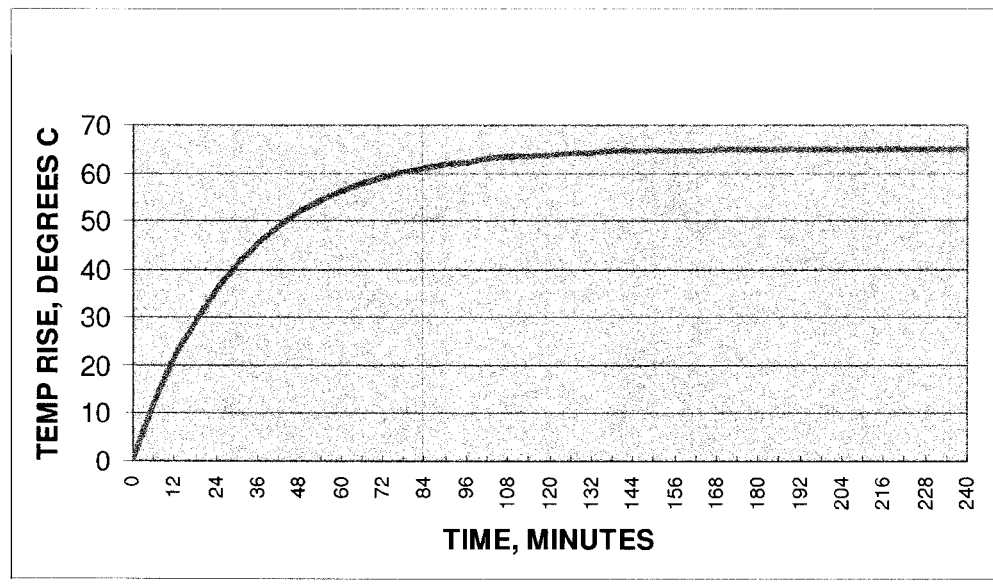
FIG. 5 is a graph displaying an exemplary time versus temperature curve.

It should be appreciated that measurements and alerts may require a time delay because temperature often lags current changes. This lag may cause improper alarms if not properly taken into account. The particular time delay setting may be dependent on the bus size, bus composition, and target sensitivity. For example, with reference to FIG. 5, an exemplary time vs temperature plot is shown for switchgear having the rated load of 2000 Amps applied. As can be seen, approximately 70 minutes passes before the bus is at 90% of the final equilibrium temperature. With knowledge of the amount of time it takes to reach an equilibrium temperature, alarms may be delayed until such time as the temperature is within an acceptable range of equilibrium.

According to one or more embodiments, an internal temperature sensor 40 (see FIG. 1) is provided that measures the ambient temperature within the switchgear. Internal ambient temperatures may be monitored to ensure they do not rise above predetermined limits. Further, the bus joint temperatures may be compared to or adjusted in accordance with the internal ambient temperature.

Switchgear typically is provided with two types of bus arrangements, single-ended and double-ended. In a single-ended switchgear, a main breaker feeds a number of feeder breakers. Main breaker current sensors (e.g., current transformers) monitor the total current flow into the single main bus. Moving downstream along the main bus, feeder breaker currents are measured and subtracted from the main incoming breaker current. Thus, the further downstream on a main bus, the less current is carried thereon. However, the common bus design (e.g., 1200A, 2000A, 3000A) is not tapered (per ANSI-IEEE C37 Standard) to compensate for this current reduction. Therefore, under normal conditions, the temperature of the bus decreases as a function of distance from the main breaker. Thus, corroded or damaged bus connections, particularly those that are relatively further from the main breaker, may be masked if temperature is the only input to an alarm function. This is because the reduced current traveling through the damaged bus connection may not raise the temperature enough to trigger an alarm.

A double-ended switchgear includes two main breakers feeding a number of feeder breakers separated (usually evenly) by a tie breaker. Both main breaker current sensors (e.g., current transformers) monitor the total current flow into the respective main busses when the tie breaker is open. Traveling downstream from the main breakers, feeder breaker current is measured and subtracted from the main incoming breaker current. If the tie breaker is closed the current may no longer flow in the same direction. In such a system, the tie bus amperage may be derived from the tie breaker current sensor.

Figure 6:
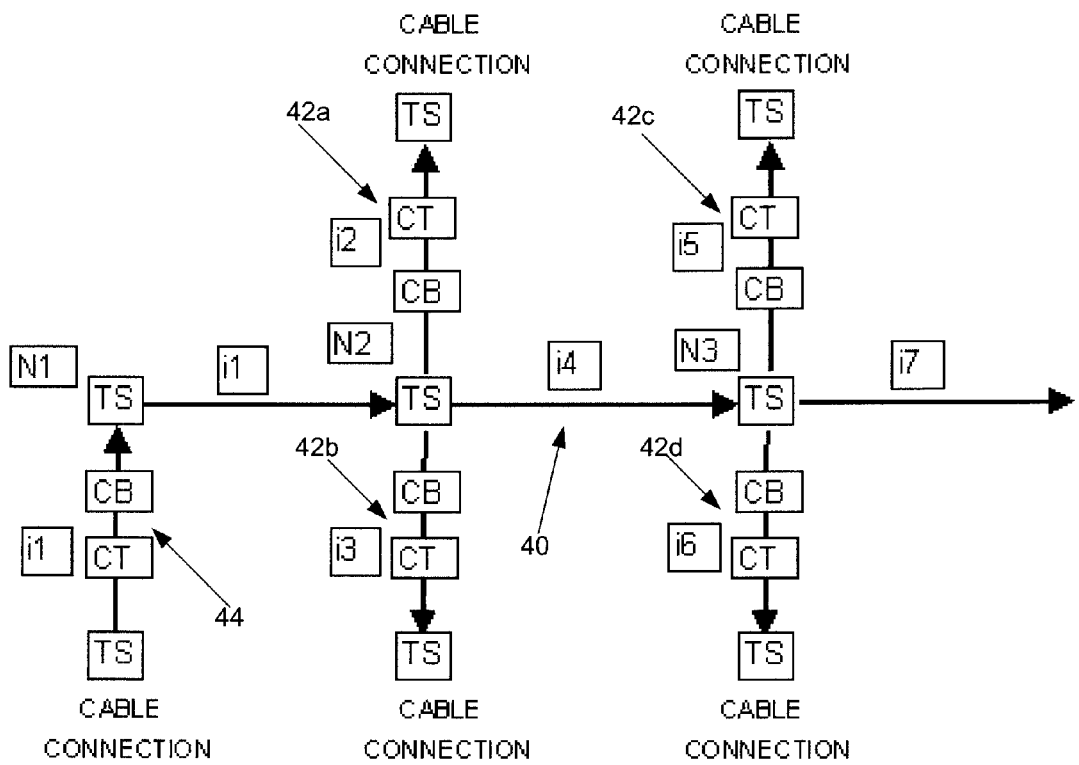
FIG. 6 is a view schematically illustrating a single-end substation and monitoring system according to the present invention.

With reference now to FIG. 6 an exemplary single ended substation (switchgear) is shown. It should be appreciated that, though only a single line is shown in the diagrams of FIGS. 6-9, the single line represents three phase power. A main bus 40 distributes power to a plurality of feeder circuits 42a-42d. Each feeder circuit includes a circuit breaker CB and a current transformer CT (current sensor) that may respectively interrupt and measure the flow of current in the feeder circuit. As is shown, a temperature sensor TS is secured to the main bus at each feeder circuit connection and also secured to the feeder circuit at the cable connection. Arrows indicate the direction of current travel, thus, it can be seen that input circuit 44 is the source of power for main bus 40. As with feeders 42a-d, input circuit 44 includes a circuit breaker CB and a current transformer CT (current sensor) that measures the flow of current through the input circuit 44.

For purposes of the present invention, a node is defined as the electrical connection or joint between the main bus and a feeder or input circuit. Thus, in the system shown in FIG. 3, a node N1 is located at the electrical connection of input circuit 44 and main bus 40. Node N2 is located at the electrical connection of feeder circuits 42a and 42b and main bus 40. Finally, node N3 is located at the electrical connection of feeder circuits 42c and 42d and main bus 40. As can be seen, a temperature sensor TS is positioned at each node, however, no current transformers CTs (current sensors) are positioned at the nodes. Current sensors are not placed at the nodes because of cost considerations and because current transformers are generally too large to be secured to the main bus.

Because no CT is positioned at the nodes, the industrial computer must calculate the current flow at each node. According to one embodiment, the nodal current is determined by summing the upstream input current and subtracting the current flowing through all upstream feeder circuits. For example, in the embodiment of FIG. 3, the current at node N1 is ii. This value is known from the CT on the incoming feeder connection 44. The current at node N2 is also ii as no upstream feeder circuits subtract from the input current. Finally the current at node N3 is i4 which is calculated in the following manner: I4=i1+(−i2)+(−i3).

In this manner the current flowing through a node may be mathematically determined. This value is then available to correlate to temperature readings taken by temperature sensors TS directly monitoring the temperature at each node. As discussed above, the combined temperature-current values may then be correlated to prediction curves or zones for expected temperature at a given current flow.

Figure 7:
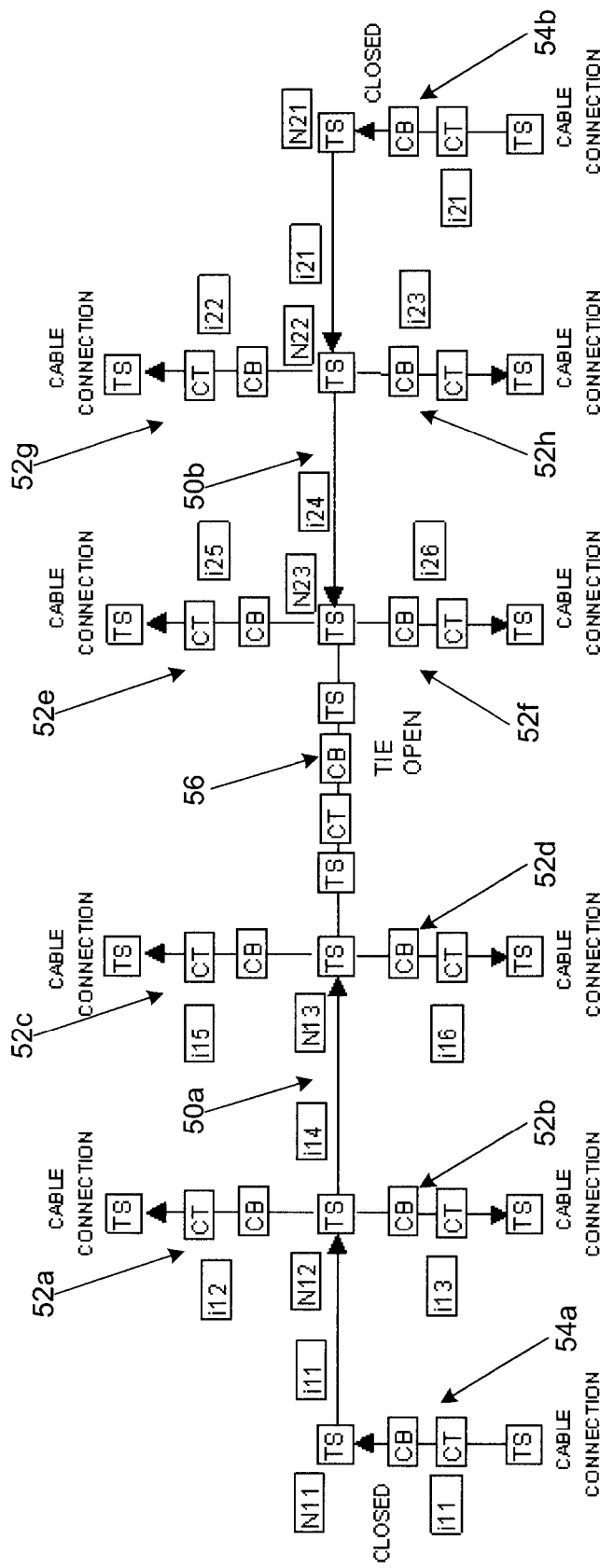
FIG. 7 is a view schematically illustrating a double-ended substation and monitoring system wherein the tie breaker is open.

With reference now to FIG. 7, a double-ended substation is shown, wherein both incoming main breakers are closed and the tie breaker is open. A circuit breaker 56 (tie breaker) electrically connects the two halves of a main bus 50a and 50b that distributes power to feeder circuits 52a-52d and 52e-52h respectively. Each feeder circuit includes a circuit breaker CB and a current transformer CT (current sensor) that respectively interrupts and measures the flow of current through the feeder circuit. As is shown, a temperature sensor TS is secured to the connection between the main bus 50 and each feeder circuit. A temperature is also secured to the feeder circuit at the cable connection. Arrows indicate the direction of current travel, thus, it can be seen that input circuits 54a and 54b are the source of power for main bus 50a and 50b respectively. As with feeder circuits 52a-h, input circuits 54a and 54b each include a circuit breaker CB and a current transformer CT (current sensor) that measures the flow of current through the circuit.

A node N11 is located at the electrical connection of feeder circuit 54a and main bus 50a. Node N12 is located at the electrical connection of feeder circuits 52a and 52b and main bus 50a. Node N13 is located at the electrical connection of feeder circuits 52c and 52d and main bus 50a. A node N21 is located at the electrical connection of input circuit 54b and main bus 50b. Node N22 is located at the electrical connection of feeder circuits 52e and 52f and main bus 50b. Node N23 is located at the electrical connection of feeder circuits 52g and 52h and main bus 50b. As with the system shown in FIG. 3, a temperature sensor TS is positioned at each node, however, no current transformers CTs (current sensors) are positioned at the nodes. As with the embodiment of FIG. 6, because no CT is positioned at the nodes, the industrial computer must calculate the current flow at each node. According to one embodiment, the nodal current is determined by summing the upstream input current and subtracting the current flowing through all upstream feeder circuits. Thus, in the embodiment of FIG. 7, the current at node N21 is i21. This value is known from the current sensor CT on the input circuit 54b. The current at node N22 is also i21 as no upstream feeder circuits subtract current from the input. Finally the current at node N23 is i24 which is calculated according to the following: i24=i21+(−22)+(−i23).

Figure 8:
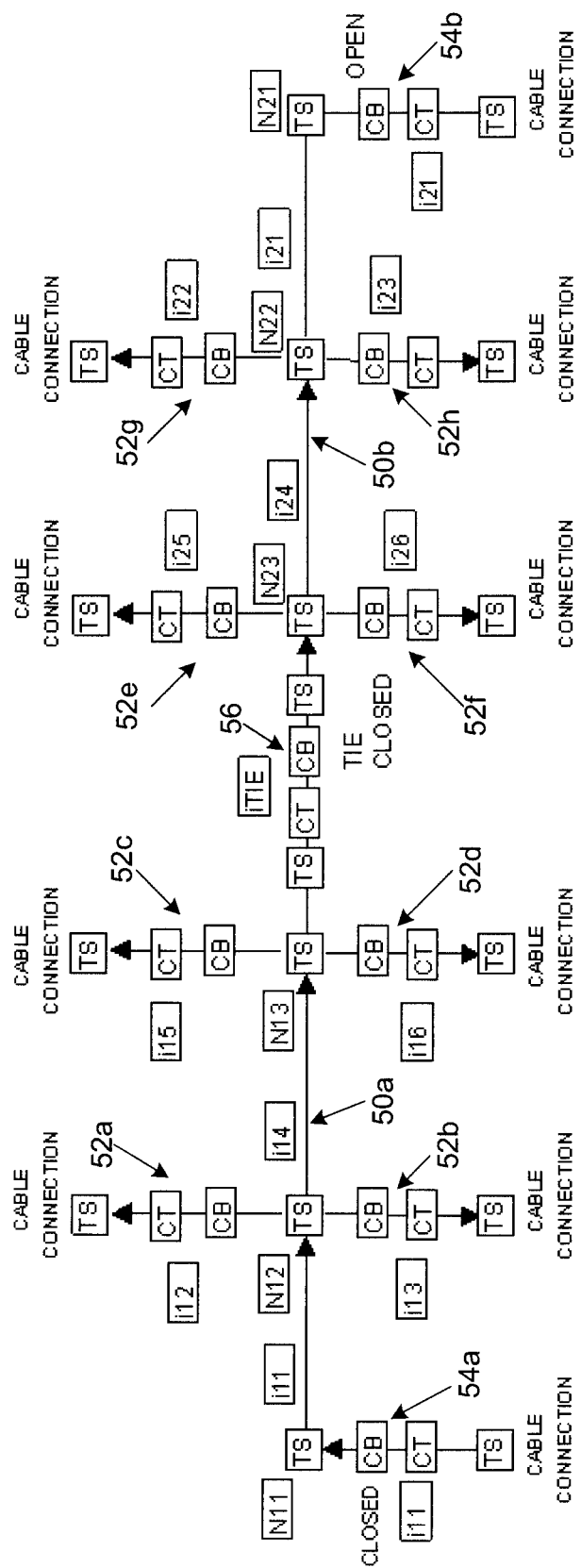
FIG. 8 is a view schematically illustrating a double-ended substation and monitoring system wherein the tie breaker is closed and one input circuit is open.

With reference now to FIG. 8, a double-ended substation is shown that is substantially similar to that shown in FIG. 7. However, in this embodiment feeder 54a is closed (supplying power), 54b is open, and tie breaker 56 is closed. Thus, as with the previous solutions, the current flow at a given node is determined by subtracting the current flowing through upstream feeder circuits from the input current (supplied through feeder 54a).

Figure 9:
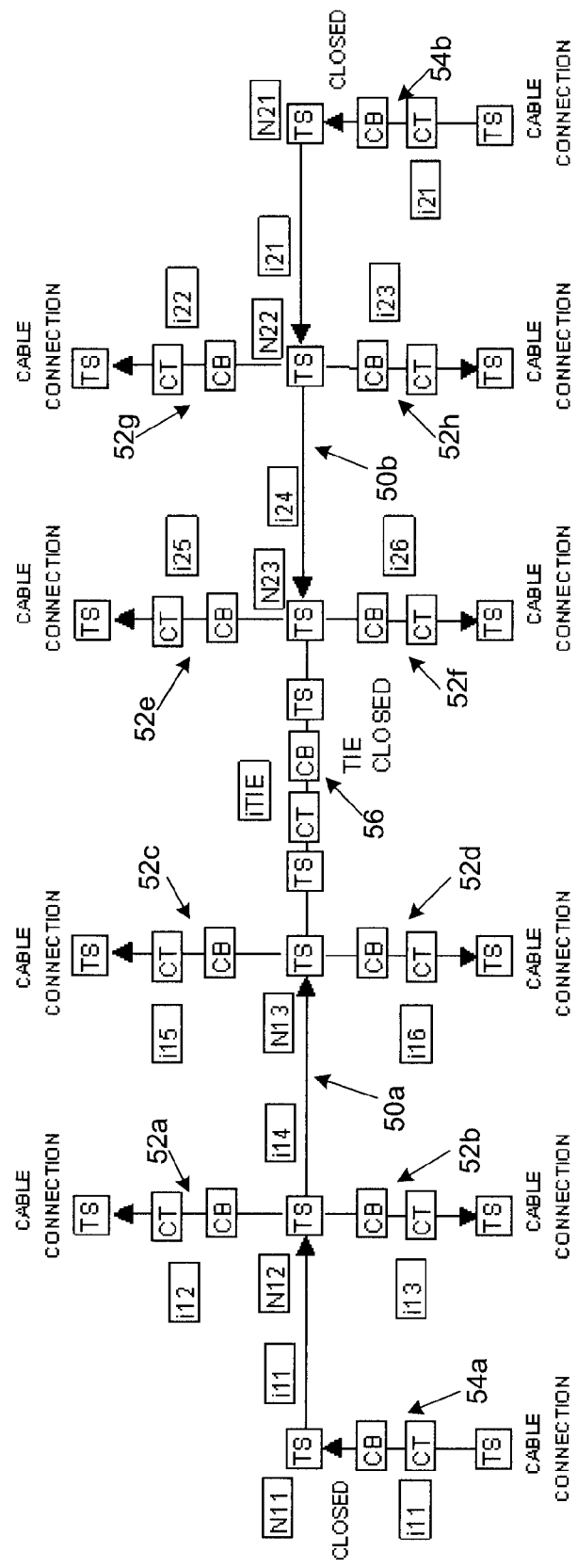
FIG. 9 is a view schematically illustrating a double-ended substation and monitoring system wherein the tie breaker is closed and both input circuits supply power.

With reference now to FIG. 9, a double-ended substation is shown that is substantially similar to that shown in FIG. 7. However in this embodiment, the tie breaker 56 is closed. In this configuration, the tie bus current may flow in either direction depending on the respective input and feeder circuit current flows. However, using the algebraic approach discussed above, and with the application of consistent polarities, the nodal current flow can be found by summing the current values at the upstream inputs and outputs.

To properly address the tie breaker current, tie current transformer output signal is part of the current calculations for nodes N13 and N23. The tie current transformer has a polarity that is determined by its mounting orientation and direction of the current flow there through. The current transformer secondary signal polarity is (+ −) for one direction and (− +) in the other direction. Thus the secondary signal polarity at N23 is the opposite of the signal used to calculate total current into N13. This causes the current flowing into N13 and out of N23 (or into N23 and out of N13) to always have the correct polarity for purposes of the calculations. As an alternative, a tie breaker may have current transformers CT on both sides of the tie bus. In this case, the current transformer on each side can measure the respective currents. In this manner the amount and direction of the current flow through the tie breaker may be determined, and likewise the current calculation may be performed at nodes N13 and N23. For example, if current flows through the tie breaker towards N23, the calculation to find the current at N13 is performed in the same manner in FIG. 6, by summing the upstream input ill and subtracting the upstream currents flowing through the upstream feeder circuits, 52a-d. In other words, the tie circuit current only affects the node calculation if it is flowing towards a given node.

As should be appreciated, the electrical layout of the system (e.g., FIGS. 6-9) is manually input into the industrial computer prior to operation of the monitoring system. By inputting the electrical layout and associating incoming sensor signals with specific temperature and current sensors, the correct correlations and algebraic current interpolations are made possible.

Using the above discussed method and system, the temperature readouts are simple to perform, and can be done (e.g., by use of wireless temperature sensors) without major disassembly of a switchgear. When combined with the aforementioned current data, an in-depth picture is provided of the condition of the conductors and their joints. Furthermore, the present invention does not require use of special current sensors. Nodal current values are computed using knowledge of the switchgear circuit and mathematical algorithms in the industrial computer used for monitoring purposes. Still further, the temperature readings are combined with current readings at exactly the same nodal location. The actual instantaneous current flowing is a combination of measurements from the CTs installed in the switchgear and calculations based on the knowledge of the construction of the distribution circuit within the switchgear.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claim.

The invention claimed is:

1. A system for monitoring switchgear having a main bus, a plurality of feeder circuits, and an input circuit, the system comprising:
    a plurality of temperature sensors coupled to the main bus at nodes, wherein a node is a connection point between said main bus and each said feeder circuit;
    an input current sensor positioned to measure the current supplied to said main bus by said input circuit;
    a plurality of output current sensors positioned to measure the current flowing through said plurality of feeder circuits;
    a processor;
    one or more storing units for storing signals output from the temperature and current sensors;
    software program instructions which are stored in one or more of said storing units and when executed by the processor cause the system to perform a method comprising:
        receiving configuration information defining the relative locations and electrical connections between said main bus, said feeder circuits, said input circuit and said nodes;
        determining the current flow through one of said nodes by subtracting, the current flow through each said feeder circuit upstream from said node, from the current supplied by said input circuit;
        determining an alarm condition if the temperature at said node exceeds a predetermined temperature value for a given current flow through the node; and
        displaying said alarm condition to a switchgear operator.

2. The system of claim 1 wherein said plurality of temperature sensors comprise wireless temperature sensors.

3. The system of claim 2 wherein said wireless temperature sensors form a mesh network infrastructure.

4. The system of claim 1 wherein said predetermined value is calculated based on the following equation: $T=k*(I^2)$ where I is the current flowing through said node; T is the temperature at said node; and k is a temperature constant correlating to the size and composition of said main bus at said node.

5. The system of claim 1 wherein said software program instructions further comprise delaying said determination of an alarm condition until the node temperature is within a predetermined range of equilibrium.

6. A method of monitoring switchgear having a main bus, a plurality of feeder circuits, and an input circuit, the method comprising:
    measuring the current supplied to said main bus by the input circuit;

measuring the current flowing through said plurality of feeder circuits;

measuring the temperature of said main bus at one or more nodes, wherein a node is a connection point between said main bus and each said feeder circuit;

determining the current flow through one of said nodes by subtracting, the current flow through each said feeder circuit upstream from said node, from the current supplied by said input circuit;

determining an alarm condition if the temperature at said node exceeds a predetermined temperature value for a given current flow through the node; and displaying said alarm condition to a switchgear operator.

7. The method of claim 6 wherein said step of measuring the temperature of said main bus is performed by wireless temperature sensors.

8. The method of claim 7 wherein said wireless temperature sensors form a mesh network infrastructure.

9. The method of claim 6 wherein said predetermined value is calculated based on the following equation: $T=k*(I^2)$ where I is the current flowing through said node; T is the temperature at said node; and k is a temperature constant correlating to the size and composition of said main bus at said node.

10. The method of claim 6 further comprising, delaying said determination of an alarm condition until the node temperature is within a predetermined range of equilibrium.

* * * * *